US005383066A

United States Patent [19]

Kim

[11] Patent Number: 5,383,066

[45] Date of Patent: Jan. 17, 1995

[54] COMPENSATION FOR THE DROPOUT OF A DRUM FREQUENCY GENERATOR SIGNAL IN A DRUM SERVO SYSTEM

[75] Inventor: Kyoung-Hwan Kim, Boocheon, Rep. of Korea

[73] Assignee: Samsung Electronics Co., Ltd., Suwon, Rep. of Korea

[21] Appl. No.: 101,242

[22] Filed: Aug. 2, 1993

[30] Foreign Application Priority Data

Jul. 31, 1993 [KR] Rep. of Korea ........................ 13822

[51] Int. Cl.[6] ........................................ G11B 21/04

[52] U.S. Cl. .................................... 360/70; 360/73.01

[58] Field of Search .................... 360/73.14, 73.03, 69, 360/70, 71, 73.01, 73.04, 73.09, 73.11, 75, 38.1; 358/321, 322

[56] References Cited

U.S. PATENT DOCUMENTS 4,295,171 11/1981 Hirota et al. ................ 360/73.14 X
4,686,583 8/1987 Tomita et al. ................ 360/38.1 X
4,959,733 9/1990 Miura et al. ................ 360/73.03 X

*Primary Examiner*—Aristotelis M. Psitos
*Assistant Examiner*—James L. Habermehl
*Attorney, Agent, or Firm*—Charles R. Donohoe; Robert A. Westerlund, Jr.; Stephen R. Whitt

[57] ABSTRACT

A drum servo system controls rotation of a head drum stably, even though a DFG signal has been dropped out. The drum servo system includes a DFG signal dropout detector for detecting the dropout of the DFG signal to generate first and second switching signals according to the detection. A digital-to-analog converter generates a drum motor driving voltage in dependence upon the first switching signal when the DFG signal is in a normal state and upon the second switching signal when the DFG signal is in an abnormal state. When the DFG signal is in the abnormal state, a previous state of the DFG signal is used for generating the drum motor driving voltage so that the head drum may rotate stably regardless of the dropout of the DFG signal.

7 Claims, 6 Drawing Sheets

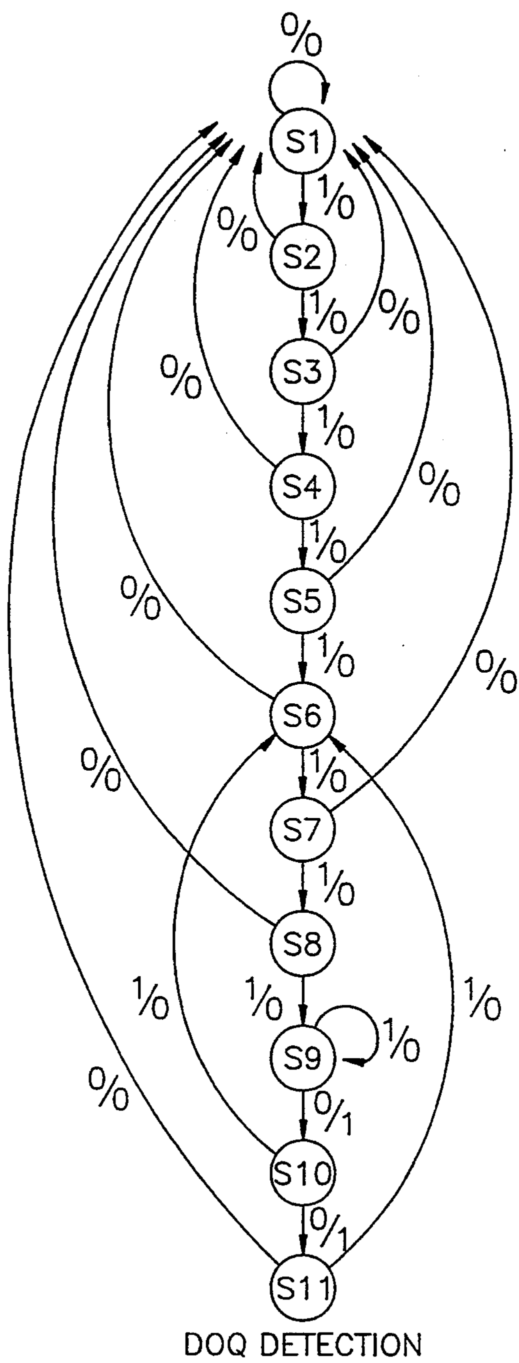
DOQ DETECTION
*FIG. 5D1*
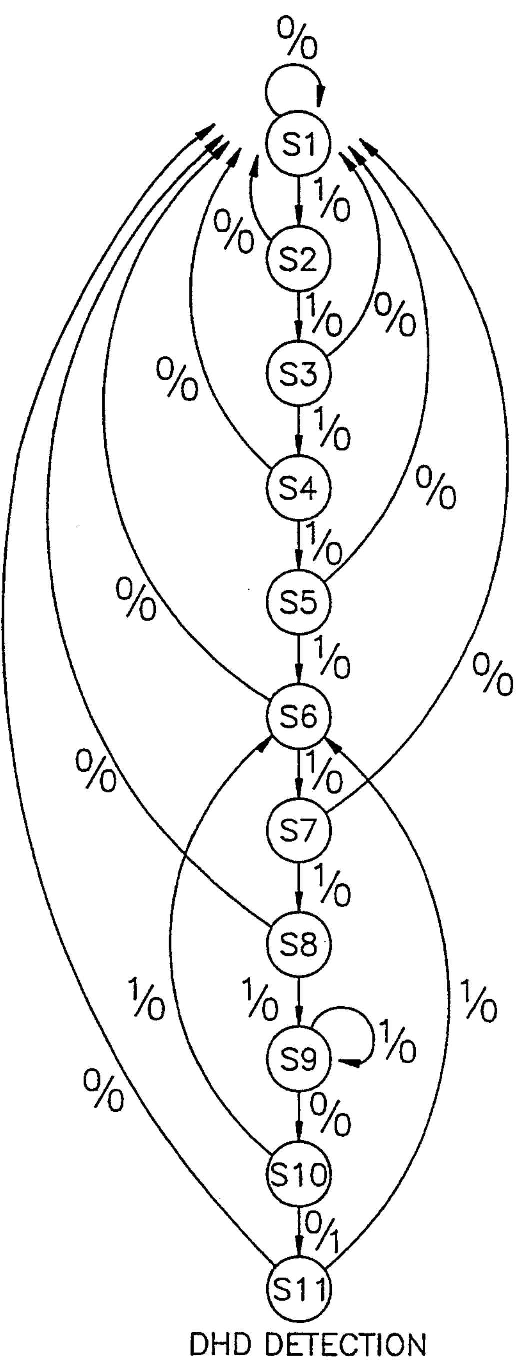
DHD DETECTION
*FIG. 5D2*

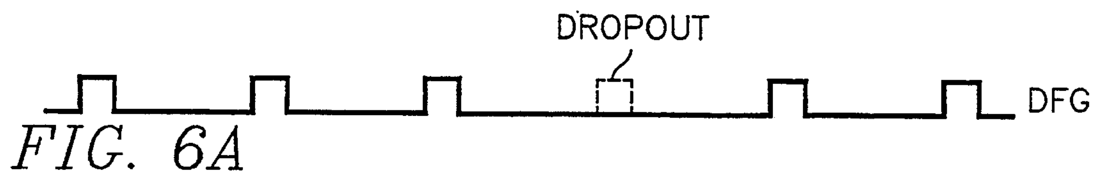
FIG. 6A
VDD
VDD/2
FIG. 6B
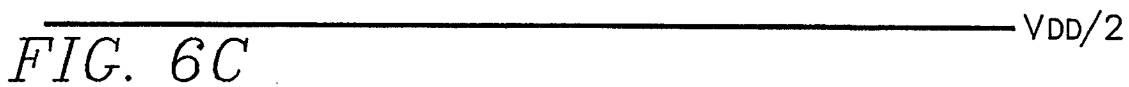
FIG. 6C
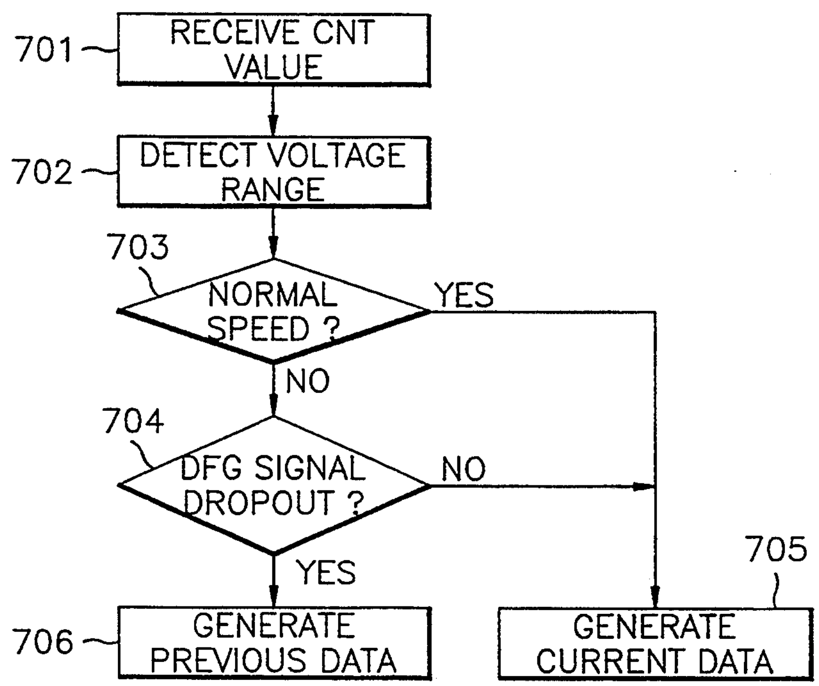
FIG. 7

COMPENSATION FOR THE DROPOUT OF A DRUM FREQUENCY GENERATOR SIGNAL IN A DRUM SERVO SYSTEM

BACKGROUND OF THE INVENTION

1. Field of the Art

The present invention relates to a mechanism control apparatus having a drum servo system therein, and more particularly to a circuit for stably driving a drum in a video tape recorder, even though a drum frequency generator signal (hereinafter, referred to as "DFG signal") dropps out.

2. Background of the Related Art

Generally, in a mechanism control apparatus employing a drum head, a DFG signal generated from the drum frequency generator is analyzed, and then drum motor driving is controlled according to the analysis result. In general, a video tape recorder (VTR) and a digital audio tape recorder (DAT) include the mechanism control apparatus and drum servo system for controlling stable rotation of drum heads. The drum servo system controls the rotation of the drum head in dependance upon the DFG signal output from a drum frequency generator.

FIG. 1 illustrates a block diagram of a known drum servo system used for a mechanism control system. The DFG signal, which is a pulse signal generated in accordance with the rotation of the drum head, is applied to a controller 102. As shown in FIG. 2, upon receipt of the DFG signal, the controller 102 resets a counter 103 at a point t1 where the DFG signal is falling down, and generates a preset signal PS shown in FIG. 1 for enabling the counter 103 at a point t2 shown in FIG. 2. Then, the counter 103 initializes a count value CNT which has been counted from the point t1 up to now, to start counting clock pulses CK, received from a clock pulse generator 101, beginning from the point t2. In other words, the counter 103 begins to count the clock pulses CK at the point t2, and continues the counting until the DFG signal reaches the next falling edge at time t3.

For example, in a VTR system, the clock pulse generator 101 receives a chrominance subcarrier signal fsc. Accordingly, it can be appreciated that the counter 103 counts the number of the chrominance subcarrier signals fsc generated for one period of the DFG signal. Further, the count value CNT from the counter 103 is supplied, through an output circuit 104, to a digital-to-analog converter 107.

The controller 102 generates a sample signal SP at the falling edge of the DFG signal, i.e., at the point t1. A memory 105 is enabled by the sample signal SP to receive and store the count value CNT counted for one period of the DFG signal. A ROM 106 receives the count value CNT stored in the memory 105 to supply an output thereof to the digital-to-analog converter 107. The digital-to-analog converter 107 receives the outputs of the ROM 106 and the output circuit 104 to generate a drum motor driving voltage DV as shown in FIG. 3.

A voltage range for driving the drum motor is determined according to the count value CNT, and the digital-to-analog converter 107 converts the voltage range data into the drum motor driving voltage. The voltage range in a linear region D2 shown in FIG. 3 is established according to the data output of the ROM 106, and the voltage ranges in non-linear regions D1 and D3 are established according to the output of the output circuit 104. That is, the digital-to-analog converter 107 establishes the voltage range of the drum motor driving voltage DV in the linear region D2 according to the output of the ROM 106, and the voltage range in the non-linear regions D1 and D3 according to the output of the output circuit 104, so that if the rotating speed of the drum is normal, the drum motor driving voltage DV is established in the liner region D2. If the rotating speed of the drum motor is higher than the normal, the drum motor driving voltage DV lies in the non-linear region D3. If the rotating speed of the drum motor is lower than the normal, the drum motor driving voltage DV lies in the non-linear region D1. Thus, the digital-to-analog converter 107 generates a drum motor driving voltage DV higher than $\frac{1}{2}$ $V_{DD}$ if the drum rotates slower than a reference rotating speed, and a drum motor driving voltage DV lower than $\frac{1}{2}$ $V_{DD}$ if the drum rotates faster than the reference rotating speed. Consequently, the drum motor driving voltage DV is maintained at $V_{DD}/2$.

In such a drum servo system, operation of the drum motor is controlled in dependance upon the DFG signal. Thus, if the DFG signal is dropped out, the digital-to- analog converter 107 generates a drum motor driving voltage DV of $V_{DD}$ (=5 V) in the non-linear region D1 owing to an abnormal count value CNT, which in turn causes a picture on the screen to flutter.

SUMMARY OF THE INVENTION

Accordingly, it is an object of the present invention to provide a circuit compensates for the dropout of a DFG signal in a drum servo system.

It is another object of the present invention to provide a circuit for detecting the dropout of a DFG signal in a drum servo system to thereby stabilize the driving of the drum motor by compensating for the drum motor driving voltage.

In the drum servo system according to the present invention, the DFG signal is digitized during motor speed control, and the digitized signal is converted into an analog signal to control the drum motor. Dropout of the DFG signal is discriminated, and, by maintaining the previous motor driving state when the DFG signal drops out, a stable driving state of the motor is maintained.

BRIEF DESCRIPTION OF THE DRAWINGS

The above objects and other advantages of the present invention will become more apparent by describing in detail a preferred embodiment thereof with reference to the attached drawings in which:

FIGS. 5A to 5D2 are detailed circuit diagrams and a state diagram of the DFG signal dropout detector shown in FIG. 4;

FIGS. 6A to 6C show output waveforms for showing a compensation for the dropout of a DFG signal in the drum servo system according to the present invention; and FIG. 7 is a flowchart for showing a compensation for the dropout of a DFG signal in the drum servo system.

DETAILED DESCRIPTION OF THE PREFERRED EMBODIMENT

Figure 4:
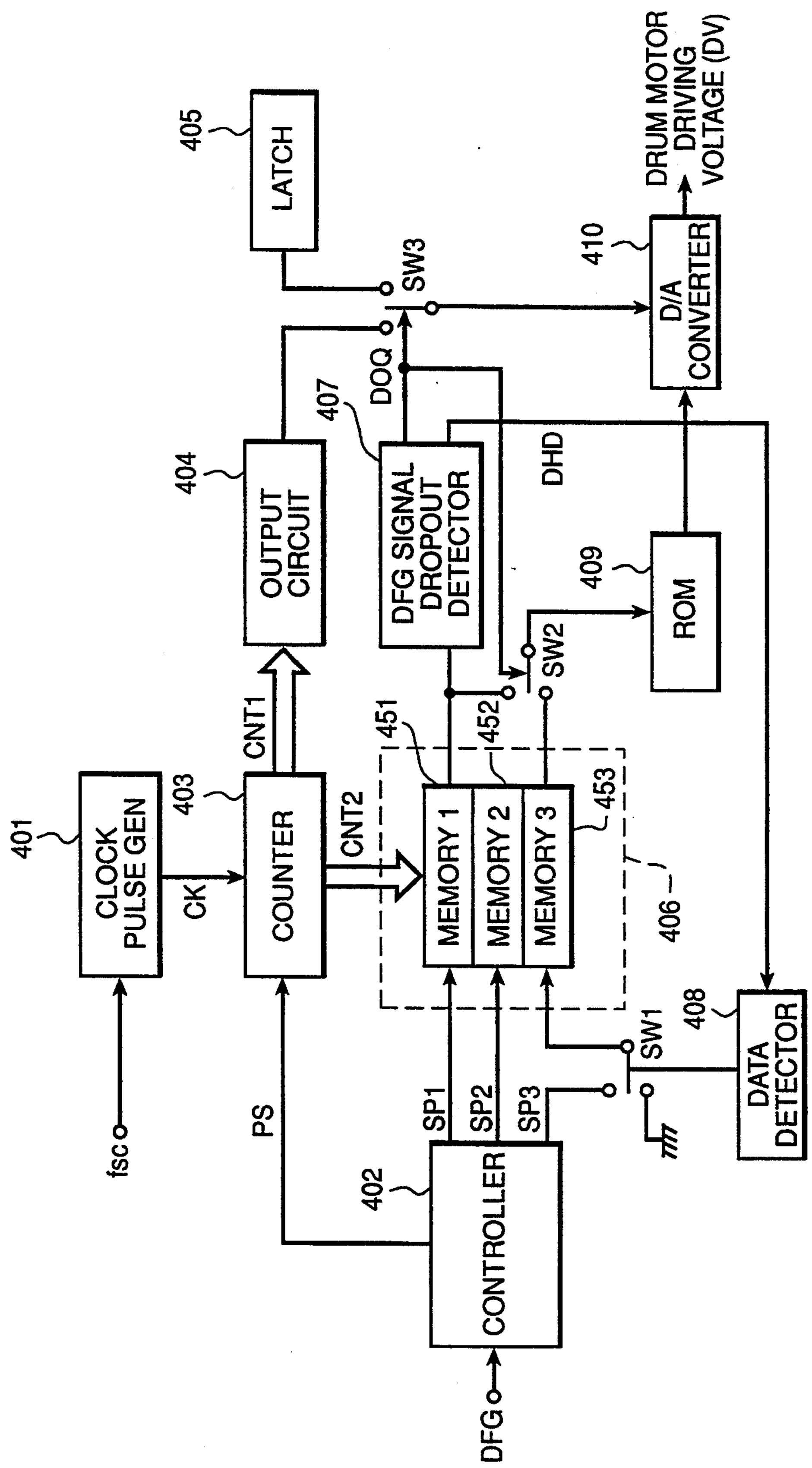
FIG. 4 is a block diagram showing a construction of a drum servo system according to the present invention.

Referring to FIG. 4, a drum servo system according to the present invention includes a controller 402 for receiving a DFG signal to sequentially generate first, third and second sample signals SP1, SP3 and SP2 at a falling edge of the DFG signal, i.e., at the point t1, and a preset signal PS for initiating a counting. A clock pulse generator 401 receives a chrominance subcarrier signal fsc to generate a clock pulse CK. A counter 403 receives the clock pulse CK output from the clock pulse generator 401 as a clock signal and the preset signal PS output from the controller 402 as an enable signal, to count the clock pulses CK for one period of the DFG signal and to provide count values CNT1 and CNT2. A memory 406, consisting of first, second and third memories 451, 452 and 453, receive the first to third sample signals SP1–SP3 from the controller 402 as control signals, respectively, in such a manner that the first memory 451 connected to the output of the counter 403 receives and stores the count value CNT2 as current data upon the receipt of the first sample signal SP1, the second memory 452, connected to the first memory 451, receives the output of the first memory 451 as previous data upon the receipt of the second sample signal SP2, and the third memory 453 connected to the second memory 452 receives and stores the output of the second memory 452 as output data upon the receipt of the third sample signal SP3. A DFG signal dropout detector 407 connected to the first memory 451 receives the current data output from the first memory 451 to detect the current voltage range of the drum motor driving voltage as well as to detect whether the DFG signal drops out or not, thereby generating a first switching signal DOQ in a first logic state for a normal state or the first switching signal DOQ in a second logic state corresponding to dropout of the DFG signal. An output circuit 404, connected to an output of the counter 403, receives the count value CNT1 to generate first output data for setting the voltage range in a non-linear region. A latch 405 stores the first output data when the DFG signal is in the normal state. A switch SW3, having a first node connected to the output circuit 404, a second node connected to the latch 405 and a control node connected to the DFG signal dropout detector 407, selects either the output of the output circuit 404 or the output of the latch 405 in response to the first switching signal DOQ of the DFG signal dropout detector 407. A data detector 408 receives a second switching signal DHD from the DFG signal dropout detector 407 to generate a data detection signal when the second switching signal DHD of the second logic state is generated. A switch SW1, having a first node connected to the third sample signal SP3, a second node connected to the ground and a control node connected to the data detector 408, allows or prevents the third memory 453 to receive or from receiving, respectively the output of the second memory 452, in response to the data detection signal output of the data detector 408. A switch SW2, having a first node connected to the output terminal of the first memory 451, a second node connected to the output terminal of the third memory 453 and a control node connected to the first switching signal DOQ of the DFG signal dropout detector 407, provides a memory 409 with either the current data from the first memory 451 or the previous data from the third memory 453, in response to the first switching signal DOQ. The memory 409, connected to receive the output of the switch SW2, outputs second output data. A digital-to-analog converter 410 receives the first and second output data received respectively from the switch SW3 and the memory 409, to establish the voltage range of the non-linear region in dependance upon the first output data and the voltage range of the linear region in dependance upon the second output data, thereby outputting an analog drum motor driving voltage.

Figure 5A:
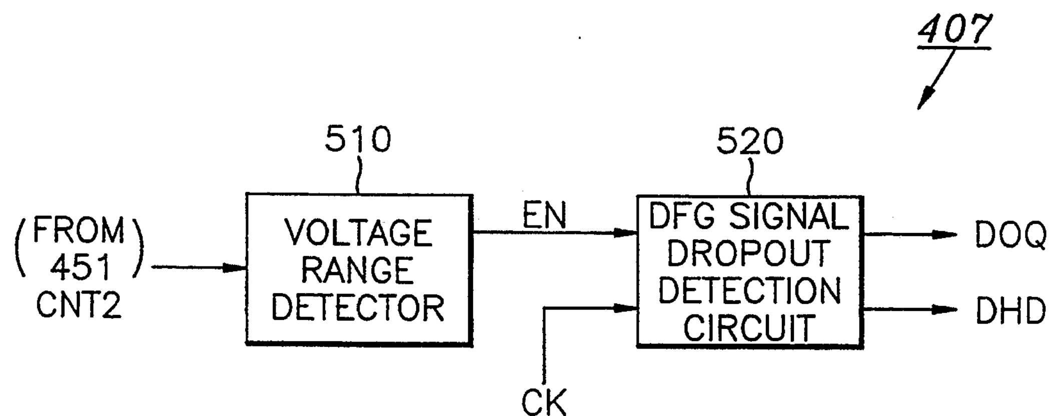

Referring to FIG. 5A, the DFG signal dropout detector 407 includes a voltage range detector 510 for analyzing the count value CNT2 to detect the voltage range and a DFG signal dropout detection circuit 520 for receiving the output of the voltage range detector 510 and analyzing the status of the voltage range detection, to generate the first and second switching signals DOQ and DHD according to the status of the DFG signal.

Figure 3:
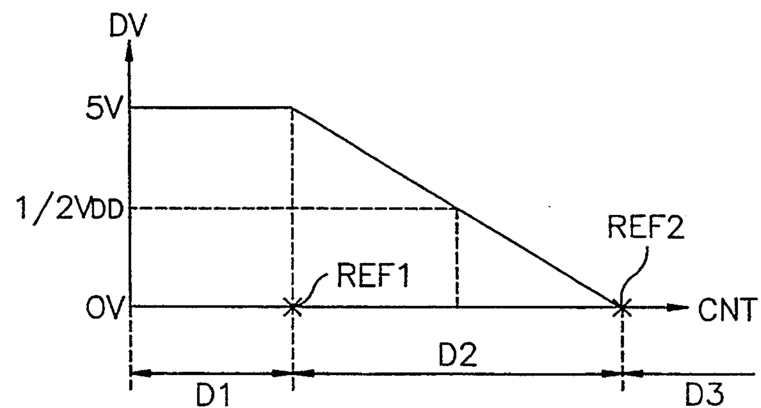
FIG. 3 is an operational waveform of the digital-to-analog converter shown FIG. 1.
Figure 5B:
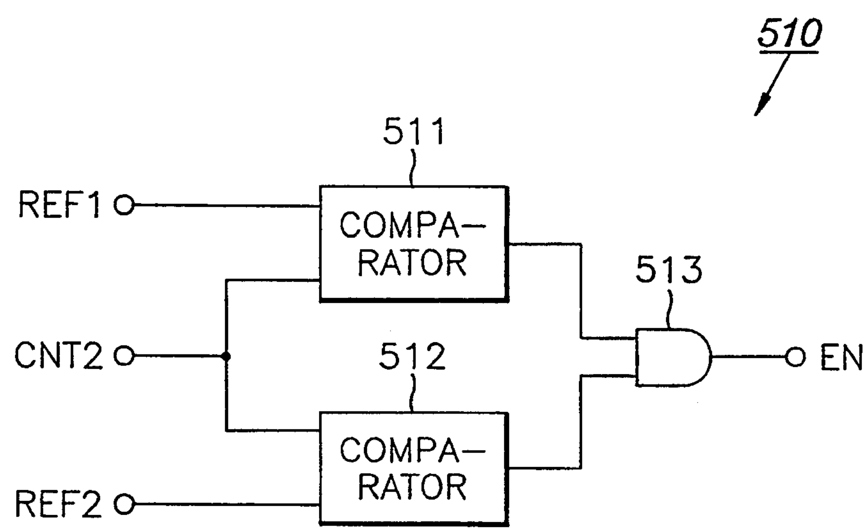

Referring to FIG. 5B, the voltage range detector 510 includes a first comparator 511 for comparing first reference data REF1 with the count value CNT2, a second comparator 512 for comparing second reference data REF2 with the count value CNT2, and an AND gate 513 for ANDing the outputs from the first and second comparators 511 and 512 to generate a voltage range detection signal EN, which indicates whether the count value CNT2 lies within a predetermined voltage range. Here, the first comparator 511 generates a normal state signal when $REF1 \leqq CNT2$, and the second comparator 512 generates a normal state signal when $REF2 \geqq CNT2$. It is noted that the voltage range detection signal EN generated by the AND gate 513 indicates that the count value CNT2 is within the predetermined voltage range if $REF1 \leqq CNT2 \leqq REF2$, as shown in FIG. 3.

Figure 5C:
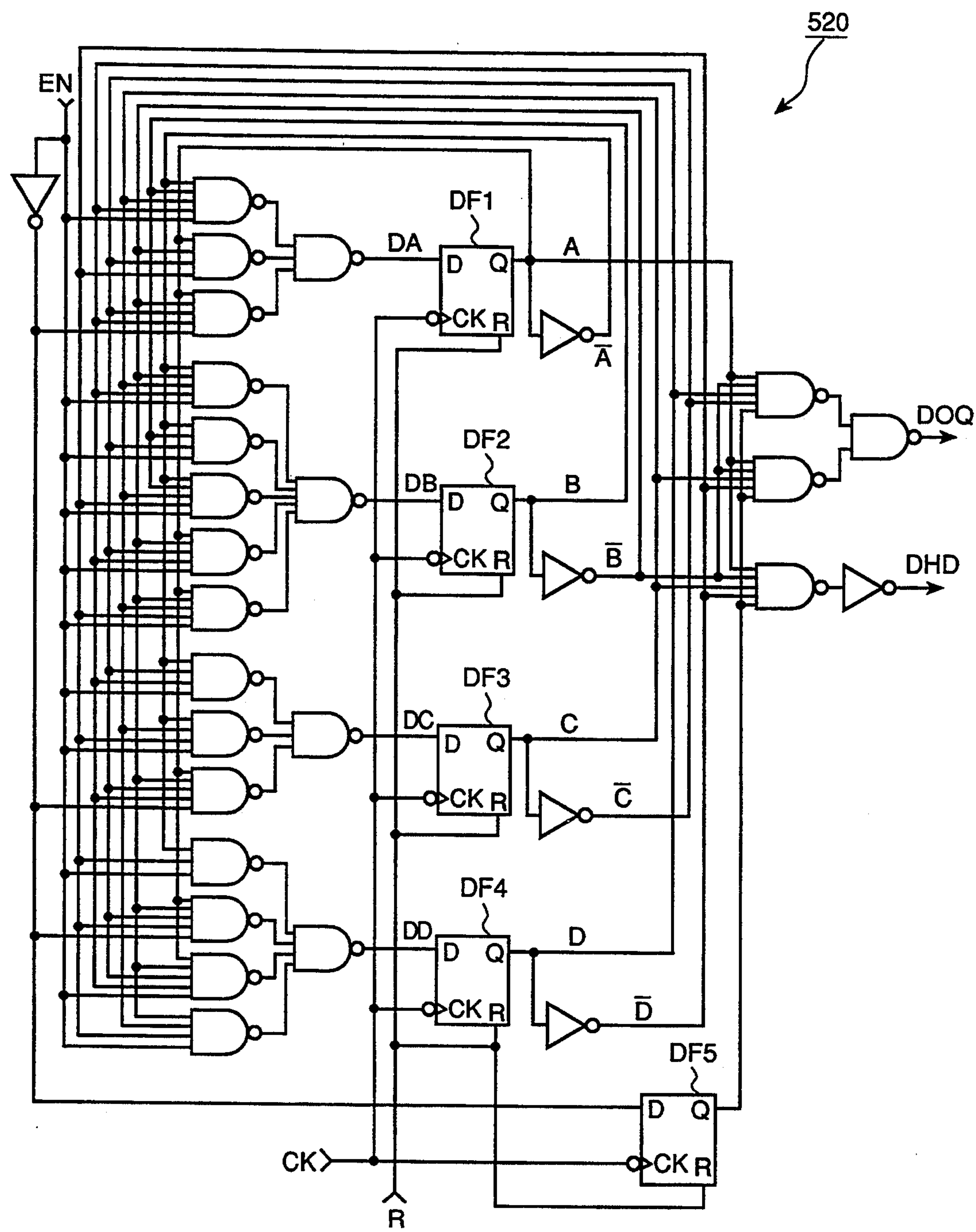

Referring to FIG. 5C, the DFG signal dropout detection circuit 520 judges the logic state of the voltage range detection signal EN, to determine whether or not the DFG signal drops out and generates the first and second switching signals DOQ and DHD according to the result of the determination.

Referring to FIG. 5D, shown is a state diagram for showing the state transitions from S1 to S11 in the circuit of FIG. 5C, and the value of each state S1–S11 are given in Table 1 below.

<TABLE 1>

| | S1 | S2 | S3 | S4 | S5 | S6 | S7 | S8 | S9 | S10 | S11 |
|---|---|---|---|---|---|---|---|---|---|---|---|
| A | 0 | 0 | 0 | 0 | 0 | 0 | 0 | 0 | 1 | 1 | 1 |
| B | 0 | 0 | 0 | 0 | 1 | 1 | 1 | 1 | 0 | 0 | 0 |
| C | 0 | 0 | 1 | 1 | 0 | 0 | 1 | 1 | 0 | 0 | 1 |
| D | 0 | 1 | 0 | 1 | 0 | 1 | 0 | 1 | 0 | 1 | 0 |

FIGS. 6A to 6C, show waveforms illustrating how to compensate dropout of the DFG signal. FIG. 6A shows the waveform of the DFG signal that is dropped out, FIG. 6B shows a waveform when the signal dropout is not compensated for according to the prior art, and FIG. 6C shows a waveform when the signal dropout is compensated for according to the present invention.

The flowchart in FIG. 7, shows the method of compensating for the dropout of the DFG signal according to the present invention. The current voltage range is detected from the count value CNT, received to detect the state of the DFG signal, and the previous data of the DFG signal is replaced with current data to compensate for the DFG signal if the DFG signal dropped out.

Operations of present invention will now be described in detail with reference to FIGS. 2 to 7.

Figure 1:
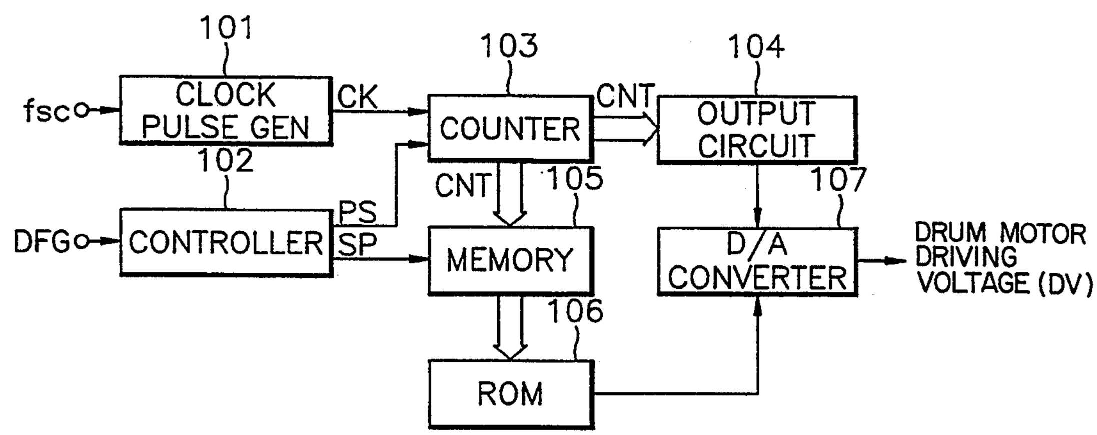
FIG. 1 is a block diagram showing a c construction of a conventional drum servo system.
Figure 2:
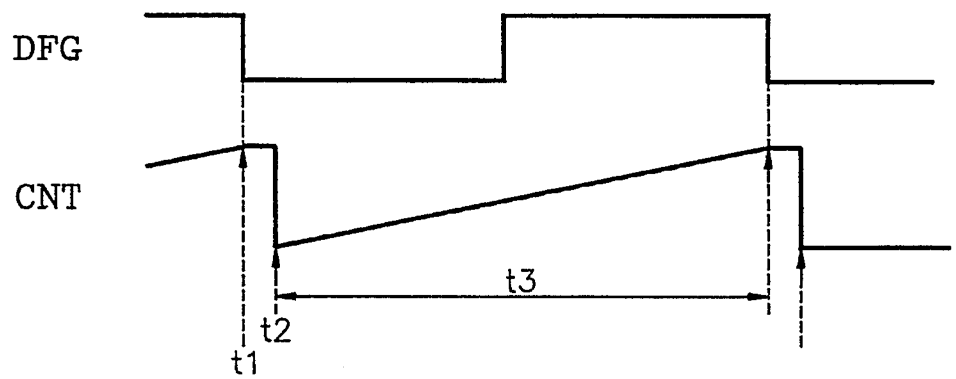
FIG. 2 is operational waveforms from the counter shown in FIG. 1.

The DFG signal, which is a pulse signal generated according to the rotation of the head drum, is supplied to the controller 402. Upon the receipt of the DFG signal, as shown in FIG. 2, the controller 402 resets the counter 403 at the point t1 when the DFG signal is falling down, and generates the preset signal PS for allowing the counter 403 to be enabled at the point t2. Then, the counter 403 initializes the count values CNT1 and CNT2 which are counted up from the point t1, and restarts counting the clock pulse CK at the point t2. The counter 403 begins counting the clock pulse CK output from the clock pulse generator 401 at the point t2 until the DFG signal reaches the next falling edge, i.e., for the time interval t3. The input to the clock pulse generator 401 is a chrominance subcarrier signal fsc in case of a VTR system. Accordingly, the counter 403 counts the number of chrominance subcarrier signals fsc generated for one period of the DFG signal. The count value CNT (CNT1, CNT2) output from the counter 403 is multi-bit data, wherein the MSB (Most Significant Bit) data thereof becomes the count value CNT1 for indicating whether the voltage range is in the linear region or in the non-linear region, and the LSB (Least Significant Bit) data becomes the count value CNT2 for controlling driving of the drum. The count value CNT1 from the counter 403 is supplied to the output circuit 404 which in turn generates the received count value CNT1 as the first output data indicative of whether the voltage range is in the linear region or in the non-linear region.

Also, the controller 402 analyzes the DFG signal to generate the first to third sample signals SP1–SP3. The first to third sample signals SP1–SP3 are used as the enable signals of the first to third memories 451–453. The first sample signal SP1 for allowing the count value CNT1 output from the counter 403 to be stored in the first memory 451 is generated at the falling edge of the DFG signal and just before a resetting of the counter 403. After the generation of the first sample signal SP1, the third sample signal SP3 and the second sample signal SP2 are sequentially generated with a predetermined time delay. That is, the third and second sample signals SP3 and SP2 are respectively the signals that are obtained by delaying the first sample signal SP1. The first memory 451 is connected to the output of the counter 403, to receive and store the count value CNT2 as the current data upon receipt of the first sample signal SP1. The third memory 453 is connected to the second memory 452 to receive and store the count value CNT2 of the previous state stored in the second memory 452 as the second output data upon receipt of the third sample signal SP3. When the second sample signal SP2 is received, the second memory 452 connected to the first memory 451 receives and stores the current count value CNT2 stored in the first memory 451.

The current count value CNT2 from the first memory 451 is supplied to the DFG signal dropout detector 407 which includes the voltage range detector 510 and the DFG signal dropout detection circuit 520 shown in FIG. SA. In the description, the first logic denotes the logic "low," and the second logic denotes the logic "high." The voltage range detector 510 detects the voltage range from the current count value CNT2 to check the rotating speed of the head drum whether it is in a normal speed or in an abnormal speed. If the head drum rotates slower than the normal, the voltage range detection signal EN is generated for indicating the dropout of the DFG signal. If the current count value CNT2 is in the linear region D2 of FIG. 3, the rotation of the drum is considered as the normal speed. The normal speed range which can be detected by the voltage range detector 510 may be set by a user. As shown in FIG. SB, the voltage range detector 510 includes the first and second comparators 511 and 512. Therefore, the logic of the voltage range detection signal EN can be determined according to the first and second reference data REF1 and REF2.

For example, if the first and second reference data REF1 and REF2 are applied as REF1≦linear region D2≦REF2, the voltage range detection signal EN is established in the linear region D2. Meanwhile, if the first and second reference data REF1 and REF2 in regions other than the linear region are applied, the voltage range detection signal EN is established in accordance with the first and second reference data REF1 and REF2. Under the assumption that the characteristic of the voltage range detector 510 is REF1≦linear region D2≦REF2, the voltage range detector 510 generates the voltage range detection signal EN of the logic "high". However, if the current count value CNT2 received from the first memory 451 is in the non-linear region D1, the rotating speed of the drum is slower than the normal speed. Then, the voltage range detector 510 senses that the drum is in the abnormal state, and generates the voltage range detection signal EN of the logic "low" to enable the DFG signal dropout detection circuit 520 of FIG. 5C. If the voltage range detector 510 generates the voltage range detecting signal EN of the logic "low", the signal dropout detection circuit 520 is enabled to thus determine whether the rotating speed has reached the normal speed. The signal dropout detection circuit 520 counts the clock pulse CK according to the logic state of the voltage range detection signal EN, to generate the first and second switching signals DOQ and DHD. Therefore, in order to check whether the rotating speed reaches the normal speed or not, the DFG signal dropout detection circuit 520 confirms whether the number of successively generated clock pulses CK is more than eight or not. Thereafter, if the logic "low" signal is generated under the state that the number of clock pulses is more than eight, the first switching signal DOQ of the logic "high" state is generated. After reaching the normal speed, if the logic "low" state is generated again under the state that the number of clock pulses is four, the first switching signal DOQ of the logic "high" state is generated. In the above voltage range, if the logic "low" state occurs once or twice, the first switching signal DOQ of the logic "high" is generated. Except for the above state, the first switching signal DOQ of the logic "low" state is generated. When the first switching signal DOQ of the logic "high" state is successively generated at least twice due to the dropout of the DFG signal as described above, the second switching signal DHD of the logic "high" state is generated. Except for this state, the second switching signal DHD is constantly output in the "low" state, which means the normal state. The second switching signal DHD serves for inhibiting the abnormal data stored the second memory 452 as the previous data caused by the dropout of the received signal from being stored in the third memory 453.

The logic expressions DA–DD of the first and second switching signals DOQ and DHD of respective D flip-flop DF1–DF4 in the DFG signal dropout detection circuit 520 shown in FIG. 5C can be written as:

$$D_A = \bar{A}BCDX + A\bar{B}\bar{C}\bar{D}\bar{X} + A\bar{B}\bar{C}\bar{D}\bar{X} + A\bar{B}\bar{C}\bar{D}\bar{X}$$

$$D_B = \bar{A}\bar{B}CDX + \bar{A}B\bar{C}\bar{D}X + \bar{A}B\bar{C}\bar{D}X + \bar{A}B\bar{C}DX + \bar{A}BC\bar{D}X + A\bar{B}C\bar{D}X$$

$$D_C = \bar{A}\bar{B}\bar{C}DX + \bar{A}\bar{B}C\bar{D}X + \bar{A}B\bar{C}DX + \bar{A}BC\bar{D}X + A\bar{B}\bar{C}D\bar{X}$$

$$= \bar{A}\bar{C}DX + \bar{A}C\bar{D}X + A\bar{B}\bar{C}D\bar{X}$$

$$D_D = \bar{A}\bar{B}\bar{C}\bar{D}X + \bar{A}\bar{B}C\bar{D}X + \bar{A}B\bar{C}\bar{D}X + \bar{A}BC\bar{D}X + A\bar{B}\bar{C}\bar{D}X + A\bar{B}\bar{C}DX + A\bar{B}C\bar{D}X$$

$$= \bar{A}\bar{D}X + \bar{A}\bar{B}\bar{C}\bar{D}\bar{X} + A\bar{B}\bar{C}DX + \bar{B}C\bar{D}X$$

$$D_{OQ} = A\bar{B}\bar{C}D\bar{X} + A\bar{B}C\bar{D}\bar{X}$$

$$D_{HD} = A\bar{B}C\bar{D}\bar{X}$$

where "X" represents the voltage range detection signal EN.

A state transition of the first switching signal DOQ is shown in Table 2 in accordance with data DA-DD applied to D flip-flops DF1–DF4, data A-D output from the respective D flip-flops, and the logic state of the voltage range detection signal EN output from the voltage range detector.

<TABLE 2>

| | STATE TRANSITION TABLE | | | |
|---|---|---|---|---|
| CURRENT STATE A B C D | INPUT EN | NEXT STATE A B C D | INPUT TO FLIP-FLOPS DA DB DC DD | OUTPUT DOQ |
| 0 0 0 0 | 0 | 0 0 0 0 | 0 0 0 0 | 0 |
| 0 0 0 0 | 1 | 0 0 0 1 | 0 0 0 1 | 0 |
| 0 0 0 1 | 0 | 0 0 0 0 | 0 0 0 0 | 0 |
| 0 0 0 1 | 1 | 0 0 1 0 | 0 0 1 0 | 0 |
| 0 0 1 0 | 0 | 0 0 0 0 | 0 0 0 0 | 0 |
| 0 0 1 0 | 1 | 0 0 1 1 | 0 0 1 1 | 0 |
| 0 0 1 1 | 0 | 0 0 0 0 | 0 0 0 0 | 0 |
| 0 0 1 1 | 1 | 0 1 0 0 | 0 1 0 0 | 0 |
| 0 1 0 0 | 0 | 0 0 0 0 | 0 0 0 0 | 0 |
| 0 1 0 0 | 1 | 0 1 0 1 | 0 1 0 1 | 0 |
| 0 1 0 1 | 0 | 0 0 0 0 | 0 0 0 0 | 0 |
| 0 1 0 1 | 1 | 0 1 1 0 | 0 1 1 0 | 0 |
| 0 1 1 0 | 0 | 0 0 0 0 | 0 0 0 0 | 0 |
| 0 1 1 0 | 1 | 0 1 1 1 | 0 1 1 1 | 0 |
| 0 1 1 1 | 0 | 0 0 0 0 | 0 0 0 0 | 0 |
| 0 1 1 1 | 1 | 1 0 0 0 | 1 0 0 0 | 0 |
| 1 0 0 0 | 0 | 1 0 0 1 | 1 0 0 1 | 1(0) |
| 1 0 0 0 | 1 | 1 0 0 0 | 1 0 0 0 | 0 |
| 1 0 0 1 | 0 | 1 0 1 0 | 1 0 1 0 | 1 |
| 1 0 0 1 | 1 | 0 1 0 1 | 0 1 0 1 | 0 |
| 1 0 1 0 | 0 | 0 0 0 0 | 0 0 0 0 | 0 |
| 1 0 1 0 | 1 | 0 1 0 1 | 0 1 0 1 | 0 |

A state transition diagram according to the voltage range detection signal EN in Table 2 is as shown in FIG. 5D. Consequently, as mentioned above, it can be realized that the DFG signal dropout detection circuit 520 operates as Table 3 according to the voltage range detection signal EN output from the voltage range detector 510.

<TABLE 3>

| CURRENT STATE | | NEXT STATE 0 | NEXT STATE 1 | OUTPUT 0 | OUTPUT 1 |
|---|---|---|---|---|---|
| S1 | 0 0 0 0 | 0 0 0 0 | 0 0 0 1 | 0 | 0 |
| S2 | 0 0 0 1 | 0 0 0 0 | 0 0 1 0 | 0 | 0 |
| S3 | 0 0 1 0 | 0 0 0 0 | 0 0 1 1 | 0 | 0 |
| S4 | 0 0 1 1 | 0 0 0 0 | 0 1 0 0 | 0 | 0 |
| S5 | 0 1 0 0 | 0 0 0 0 | 0 1 0 1 | 0 | 0 |
| S6 | 0 1 0 1 | 0 0 0 0 | 0 1 1 0 | 0 | 0 |
| S7 | 0 1 1 0 | 0 0 0 0 | 0 1 1 1 | 0 | 0 |
| S8 | 0 1 1 1 | 0 0 0 0 | 1 0 0 0 | 0 | 0 |
| S9 | 1 0 0 0 | 1 0 0 1 | 1 0 0 0 | 1(0) | 0 |
| S10 | 1 0 0 1 | 1 0 1 0 | 0 1 0 1 | 1 | 0 |
| S11 | 1 0 1 0 | 0 0 0 0 | 0 1 0 1 | 0 | 0 |

In the DFG signal dropout detection circuit 520 of FIG. 5C, the reference letter EN designates the output signal of the voltage range detector 510; CK is a signal which is slightly delayed as compared with the first sample signal SP1 and is faster than the third sample signal SP3; and R is a system reset signal generated upon power-on of the apparatus. The first switching signal DOQ of the logic "high" state is generated to output the previous data. Alternatively, the first switching signal DOQ of the logic "low" state is generated to output the current data. Meanwhile, when the second switching signal DHD is at the logic "high" state, the supply of the third sample signal SP3 is blocked to allow the third memory 453 to maintain the data of the previous state unchanged. Alternatively, when the second switching signal DHD is at the logic "low" state, the third sample signal SP3 is supplied to allow the data stored in the second memory 452 to be stored in the third memory 453 as the previous data.

The above-described operation is carried out according to the steps shown in FIG. 7. First, when the current count value CNT2 is received from the first memory 451 in step 701, the DFG signal dropout detector 407 detects the voltage range in step 702. If the count value CNT2 exists in the linear region D2 of FIG. 3, the rotating speed of the drum is deemed to be normal. In this circumstance, the DFG signal dropout detection circuit 520 generates the first switching signal DOQ of the logic "low" state. Then, the switch SW2 is switched to the output of the first memory 451 so that the current count value CNT2 stored in the first memory 451 is supplied to the memory 409 which generates the second output data according to the count value input CNT2 thereof. Also, the switch SW3 is switched to the output of the output circuit 404 so that the count value CNT1 output from the output circuit 404 is selected to be output as the first output data. Thus, upon receipt of the first and second output data, the digital-to-analog converter 410 converts the rotation data of the drum motor into an analog voltage, to output the drum motor driving voltage. However, if the current count value CNT2 from the first memory 451 exists in the non-linear region D3, the rotating speed of the drum is relatively faster. Thus, the voltage range detector 510 recognizes that the drum is driven with the abnormal speed in step 703, and enables the DFG signal dropout detection circuit 520 to determine whether the DFG signal is dropped out or not, in step 704. At this time, if the DFG signal dropout detection circuit 520 determines the DFG signal dropout state, the first switching signal DOQ of the logic "high" state is generated. Then, the switch SW2 is switched to its second node in response to the first switching signal DOQ of the logic "high" state to supply the count value of the previous state received from the third memory 453 to the memory 409 as the second output data. Also, the switch SW3 is switched to the second node, thereby outputting the data output from the latch 405 as the first output data. Since the latch 405 has stored the first output data in the normal state, it outputs the normal second output data regardless of the output of the counter 403 even though the drum is driven with the abnormal speed. Then, the digital-to-analog converter 410 receives the first and second output data of the previous state to convert them into the analog voltage, thereby controlling the drum with the speed of the previous state. Accordingly, although the DFG signal drops out as described above, the speed of the drum can be maintained with the speed of the previous state, so that the drum is stably controlled.

Moreover, if the DFG signal is successively dropped out, the count value of the previous state stored in the third memory 453 cannot be normally maintained. That is, once at least two DFG signals are successively dropped out, the previous data stored in the second memory 452 cannot be used as the previous data since it already has an error therein even if the previous data is stored in the third memory 453. Therefore, when the dropout of the DFG signal is perceived, the DFG signal dropout detector 407 checks whether the DFG signal is successively dropped out or not. Thereafter, if the DFG signal is successively dropped out, the DFG signal dropout detector 407 inhibits the data of the second memory 452 from being stored in the third memory 453. First, if the DFG signal is not successively dropped out, the DFG signal dropout detection circuit 520 outputs the second switching signal DHD of the logic "low" which indicates the detection of non-successive errors. Then, the data detector 408 allows the switch SW1 to be switched to its first node, to supply the third sample signal SP3 from the controller 402 to the third memory 453. Thus, the third memory 453 receives and stores the data stored in the second memory 452 as the previous data. This operation continues until the DFG signal is dropped out once. However, if the number of the DFG signal dropout is two or higher, the data stored in the second memory 452 becomes error. Hence, the data stored in the second memory 452 must be prevented from being stored in the third memory 453. When the DFG signal dropout detection circuit 520 generates the second switching signal DHD of the logic "high" state, the number of the DFG signal dropout is two or higher. At this time, the data detector 408 allows the switch SW1 to be switched to the ground. Accordingly, the path of the third sample signal SP3 to the third memory 453 is blocked, which disables the third memory 453, so that the third memory 453 cannot receive the output of the second memory 452. Consequently, the third memory 453 stores the count value of the previous state generated in normal state when the drum operates with abnormal speed. When the drum is not driven with the normal speed, the digital-to-analog converter 410 generates the drum motor driving voltage for keeping the drum motor being rotated with the normal speed.

Furthermore, when the above-described drum servo system is embodied, the memory 406 may consist of a count memory for storing the count value CNT2 output from the counter 403 and a submemory for storing fixed data set by a prescribed value. In this case, the count memory corresponds to the first memory 451, and the set memory functions as the second and third memories 452 and 453. Thus, if the first switching signal DOQ indicating the normal state is output from the DFG signal dropout detector 407, the switch SW2 is switched to the count memory, so that the current count value CNT2 is supplied to the digital-to-analog converter 410. Otherwise, if the DFG signal dropout detector 407 outputs the first switching signal DOQ indicating the abnormal state, the switch SW2 is switched to the set memory side, so that the fixed data is output to the digital-to-analog converter 410. Therefore, according to this construction, by stably driving the motor when the received DFG signal is dropped out, the driving of the drum can be stably controlled.

As a result, when the above-described drum servo system is employed in a VTR system, the previous driving state of a drum is maintained even though a DFG signal of the drum is dropped out, so that not only the instantaneous vibrating phenomenon in the output of a drum phase detector but also fluttering of a screen due to the vibration of a video head switch signal can be prevented.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. A drum servo system having a drum motor, comprising:

controlling means for generating a count control signal and memory control signals according to a drum frequency generator signal generated in accordance to rotation of the drum motor;

counting means for counting a clock pulse generated according to rotation of the drum motor to generate a count value, said counting means being enabled upon receipt of the count control signal; memory means for receiving said count value according to said memory control signals to store the count value as current data and store a count value of current data as previous data; detecting means connected to receive said current data, for detecting a voltage range to generate a first switching signal according to the voltage range, wherein said first switching signal becomes a first logic state when said drum frequency generator signal is determined to be in a normal speed range and a second logic state when said drum frequency generator signal is determined to be in an abnormal speed range;

first data output means for receiving the count value and storing the count value received, to generate the count value as first output data when the first switching signal is at the first logic state and generate the stored count value as the first output data when the first switching signal is at the second logic state;

second data output means for receiving the current and previous data from said memory means, to selectively output a selected one of the current and previous data according to the first switching signal from said detecting means, wherein the current data is output as second output data when the first switching signal is at the first logic state, and the previous data is output as the second output data when the first switching signal is at the second logic state; and digital-to-analog converter means receiving said first and second output data, for generating a drum motor driving voltage, wherein said drum motor driving voltage is determined by the first output data when said drum frequency generator signal is in the normal state and said drum motor driving voltage is determined by the second output data when said drum frequency generator signal is in the abnormal state.

2. A drum servo system as claimed in claim 1, wherein said detecting means comprises: a voltage range detector receiving the current data, for detecting a voltage range from the received current data to generate a voltage range detection signal, wherein the voltage range detection signal is at the first logic state when the voltage range is determined to be in a normal state and the voltage range detection signal is at the second logic state when the voltage range is determined to be in an abnormal state; and a drum frequency generator signal dropout detection means receiving the voltage range detection signal, for generating the first switching signal and a second switching signal, said signal dropout detection means being disabled upon receipt of the first logic state of the voltage range detection signal to generate the first logic state of the first and second switching signals, said signal dropout detection means being enabled upon receipt of the second logic state of the voltage range detection signal to generate the second logic state of the first and second switching signals.

3. A drum servo system as claimed in claim 2, wherein said voltage range detector comprises:

first comparing means for comparing said current data with first reference data;

second comparing means for comparing said current data with a second reference data; and means for generating said voltage range detection signal if said current data lies between the first and second reference data.

4. A drum servo system comprising:

controlling means for generating a count control signal and memory control signals according to a drum frequency generator signal generated in accordance to rotation of the drum motor;

counting means for counting a clock pulse generated according to rotation of the drum motor to generate a count value, said counting means being enabled upon receipt of the count control signal; memory means for receiving said count value according to said memory control signals to store the count value as current data and store a count value of current data as previous data;

detecting means connected to receive said current data, for detecting a voltage range to generate a first switching signal according to the voltage range, wherein said first switching signal becomes a first logic state when said drum frequency generator signal is determined to be in a normal speed range and a second logic state when said drum frequency generator signal is determined to be in an abnormal speed range;

data detecting means connected to the output of said detecting means, for blocking a predetermined one of said memory control signals supplied to the memory means in response to a second switching signal, so as to maintain the previous data;

first data output means for receiving the count value and storing the count value received, to generate the count value as first output data when the first switching signal is at the first logic state and generate the stored count value as the first output data when the first switching signal is at the second logic state;

second data output means for receiving the current and previous data from said memory means, to selectively output a selected one of the current and previous data according to the first switching signal from said detecting means, wherein the current data is output as second output data when the first switching signal is at the first logic state, and the previous data is output as the second output data when the first switching signal is at the second logic signal; and digital-to-analog converter means receiving said first and second output data, for generating a drum motor driving voltage, wherein said drum motor driving voltage is determined by the first output data when said drum frequency generator signal is in the normal state and said drum motor driving voltage is determined by the second output data when said drum frequency generator signal is in the abnormal state.

5. A drum servo system as claimed in claim 4, wherein said detecting means comprises:

a voltage range detector receiving the current data, for detecting a voltage range from the received current data to generate a voltage range detection signal, wherein the voltage range detection signal is at the first logic state when the voltage range is determined to be in a normal state and the voltage range detection signal is at the second logic state when the voltage range is determined to be in an abnormal state; and first switching signal generating means receiving the voltage range detection signal, for generating the first switching signal, said first switching signal generating means being disabled upon receipt of the first logic state of the voltage range detection signal to generate the first logic state of the first switching signal, said first switching signal generating means being enabled upon receipt of the second logic state of the voltage range detection signal to generate the second logic state of the first switching signal; and second switching signal generating means for generating said second switching signal if the first switching signal of the second logic state is generated two or more times successively.

6. A drum servo system as claimed in claim 4, wherein said memory means comprises first to third memories, wherein said memory control signals comprise first to third memory control signals each being supplied to the respective first to third memories, and are generated sequentially in the order of the first, the third and the second memory control signals upon receipt of the drum frequency generator signal, wherein said first memory stores said count value from said counting means as the current data in response to the first memory control signal, said third memory stores output of said second memory as the previous data in response to said third memory control signal, and said second memory stores the output of said first memory as the previous data in response to said second memory control signal.

7. A drum servo system as claimed in claim 5, wherein said memory means comprises first to third memories, wherein said memory control signals comprise first to third memory control signals each being supplied to the respective first to third memories, and are generated sequentially in the order of the first, the third and the second memory control signals upon receipt of the drum frequency generator signal, wherein said first memory stores said count value from said counting means as the current data in response to the first memory control signal, said third memory stores output of said second memory as the previous data in response to said third memory control signal, and said second memory stores the output of said first memory as the previous data in response to said second memory control signal.

* * * * *